Patented Oct. 22, 1940

2,218,729

UNITED STATES PATENT OFFICE 2,218,729

PROCESS FOR THE PRODUCTION OF CHLOROSULPHONATES

Ernest J. Tauch and Ralph K. Iler, Cleveland Heights, Ohio, assignors to E. I. du Pont de Nemours & Company, Wilmington, Del., a corporation of Delaware No Drawing. Application October 20, 1938, Serial No. 236,044

9 Claims. (Cl. 23—50)

This invention relates to the manufacture of chlorosulphonates, and is more particularly directed to processes for making sodium chlorosulphonate wherein sodium chloride in a finely divided state is suspended and contacted with sulphur trioxide at a temperature below about 100° C.

Sodium chlorosulphonate produced by reacting sodium chloride and sulphur trioxide is believed to have the formula $NaClSO_3$, but it may be made up of a mixture including sodium chloride, sodium chlorosulphonate, and sodium pyrochlorosulphonate ($NaClS_2O_6$) as well as a small amount of free $SO_3$ when first made. Chlorosulphonates other than sodium chlorosulphonate such as, for instance, ammonium and potassium chlorosulphonates have a similar formula and structure.

When ordinary rock salt or granulated salt is contacted with sulphur trioxide under suitable conditions, there is formed on the surface of the salt crystals a coating of sodium chlorosulphonate which impedes further contact of the salt with unreacted sulphur trioxide and thereby seriously retards the subsequent rate of reaction. For similar reasons, a very slow rate of reaction is obtained when a quiescent layer of finely divided salt is contacted with sulphur trioxide.

It has recently been proposed to produce sodium chlorosulphonate by contacting salt with sulphur trioxide while subjecting the salt to attrition. Such a process constitutes a distinct advance over the methods of the prior art, but unfortunately suffers from the disadvantages that the resultant sodium chlorosulphonate product must be ground along with the salt. In many instances, such grinding of the product represents a useless expenditure of work. A product which has been subjected to excessive grinding has an increased tendency to dust which renders it undesirable in some uses. On the other hand, under some conditions the grinding action can not keep pace with the rate of product formation. In any event, the grinding of both salt and product is at best accomplished under compromise conditions.

Now we have found that a uniform homogeneous product comprising chlorosulphonate having a reduced tendency to dust may be produced by preparing a chloride in a finely divided state, suspending the fine particles, and contacting them with sulphur trioxide. More specifically, we have found that a uniform homogeneous sodium chlorosulphonate may be made by a process wherein sodium chloride is prepared in a finely divided state, suspended, and contacted with sulphur trioxide.

By the processes of our invention a rapid rate of reaction between sulphur trioxide and a finely divided chloride is effected, the particles of chloride being so small that they are penetrated substantially completely by the sulphur trioxide in a reasonable reaction period. Because the chloride particles are suspended in a gaseous medium, there is likewise no tendency for certain of the particles to become saturated with sulphur trioxide while others remain uncontacted as is the case when a quiescent layer of finely divided chloride is used.

The necessity of grinding the finished product simultaneously with the unreacted chloride is avoided by our novel processes. The work thus saved results in a saving in cost, since the reaction may be carried out under optimum conditions without regard to or provision for the grinding of the product.

The finely divided chloride used in a process of our invention should be of such size that substantially all of it will pass thru a sixty mesh screen, the average diameter of the particles therefore not substantially exceeding about .0246 millimeter. Preferably, the chloride should not be substantially larger than about 200 mesh, although it will be understood that in the commercial application of our novel processes the advantages of using salt of extreme fineness must be balanced economically against the expense of obtaining such extreme states of subdivision.

To produce salt in the above-described state of sub-division, numerous methods may be used. The salt may, for instance, be ground in a suitable mill, such as a ball mill or an edge roller mill or an impact pulverizer. A thermal method may also be used whereby the salt is vaporized at high temperatures and condensed as a fog by suitably cooling the vapor.

The manner of suspending a finely divided chloride for use in a process of our invention may be varied considerably. The chloride may be first suspended in an inert gas and then contacted with the sulphur trioxide or it may be projected directly into the sulphur trioxide as, for instance, in a tumbling barrel into which the sulphur trioxide-containing gas is fed directly.

Contact of the sulphur trioxide-containing gas with the finely divided chloride may be effected in any type of chamber in which the chloride remains suspended sufficiently long to permit substantial penetration of the sulphur trioxide into the chloride. The chloride may be kept suspended mechanically as, for instance, by employing a tumbling barrel as above described or it may be kept suspended by maintaining a sufficiently high gas velocity thru the reaction chamber.

The contact of sulphur trioxide on a suspended finely divided chloride, according to our invention, should be carried our under such temperature conditions as will permit an optimum rate of reaction. The temperature at which the contact is effected must not be too low or else the rate of sulphur trioxide condensation on the chloride so much exceeds the reaction rate that a pasty mass is formed which is difficult to handle. In general, a contact of the sulphur trioxide and chloride should not be conducted with temperatures substantially below about 30° C. while more particularly, when manufacturing sodium chlorosulphonate or ammonium chlorosulphonate the temperature should not be allowed to go much below about 50° C.

Too high a temperature, similarly, should not be used because the amount of the condensed free sulphur trioxide in the salt mass will be decreased, thus slowing down the reaction particularly in the manufacture of sodium chlorosulphonate.

In the manufacture of sodium chlorosulphonate a temperature not substantially higher than about 80° C. should preferably be used because about this temperature sulphur trioxide does not condense in the mass rapidly enough to enable the reaction to proceed with sufficient rapidity.

The temperatures should be maintained, moreover, below those at which the chlorides being treated become soft by the action of heat. For instance, with ammonium chloride a temperature not substantially higher than about 100° C. is for this reason preferred.

In the manufacture of sodium chlorosulphonate by reacting finely divided suspended sodium chloride with sulphur trioxide a temperature between about 50 and 60° C. is specifically preferable.

The reaction of sulphur trioxide on chlorides, according to our invention, is exothermic, and the temperatures at which the reaction is effected may readily be controlled in most instances by the rate of gas flow. Suitable heating or cooling means may be used as required.

The processes of our invention may be carried out as continuous or batch operations, depending upon the equipment available and the production desired. The sulphur trioxide content of the final product will preferably be that required by the empirical formula $MeClSO_3$, when Me is an alkali metal or ammonia, but may be adjusted to any desired figure, discontinuing the operation when the desired composition is reached. Thus, about one hundred sixty-four pounds of $SO_3$ will ordinarily be used per one hundred pounds of sodium chloride, but an excess or deficiency of $SO_3$ may be employed, depending upon the composition of product desired.

The sulphur trioxide content of the gas with which a finely divided suspended chloride is contacted, according to a process of our invention, may be widely varied. An $SO_3$ concentration as low as .01 per cent by volume may, for instance, be used, although it will be understood that a higher concentration will be preferable. We have found, for example, that a converter gas from a contact sulphuric acid system which contains approximately ten per cent by volume of $SO_3$ is ideally suited for use in a process of our invention.

While we have shown certain illustrative conditions, it will be understood that without departing from the spirit of our invention one skilled in the art may employ various processes wherein a finely divided suspended chloride such as sodium chloride is contacted with a sulphur trioxide-containing gas.

We claim:

1. In a process for the production of a chlorosulphonate of the group consisting of alkali metal and ammonium chlorosulphonates, the steps comprising suspending a chloride in a finely divided state in a gaseous medium and contacting it with sulphur trioxide at a temperature above about 50° C. and below the temperature at which substantial amounts of metallic sulphates are formed under the conditions of the reaction.

2. In a process for the production of sodium chlorosulphonate, the steps comprising suspending sodium chloride in a finely divided state in a gaseous medium and contacting it with sulphur trioxide at a temperature above about 50° C. and below the temperature at which substantial amounts of metallic sulphates are formed under the conditions of the reaction.

3. In a process for the production of ammonium chlorosulphonate, the steps comprising suspending ammonium chloride in a finely divided state in a gaseous medium and contacting it with sulphur trioxide at a temperature above about 50° C. and below the temperature at which substantial amounts of metallic sulphates are formed under the conditions of the reaction.

4. In a process for the production of sodium chlorosulphonate, the steps comprising grinding sodium chloride to a powder of such fineness that substantially all of it will pass thru a two hundred mesh screen, suspending the powdered salt in a stream of an inert gas, and contacting the suspended salt at a temperature between about 50 and 100° C. with about one hundred sixty-four pounds of sulphur trioxide gas per one hundred pounds of salt.

5. In a process for the production of sodium chlorosulphonate, the steps comprising suspending in a gaseous medium sodium chloride of such fineness that substantially all of it will pass a sixty-mesh screen and contacting the suspended chloride with sulphur trioxide at a temperature not substantially above about 80° C.

6. In a process for the production of sodium chlorosulphonate, the steps comprising suspending in a gaseous medium sodium chloride of such fineness that substantially all of it will pass a sixty-mesh screen and contacting the suspended chloride with sulphur trioxide at a temperature not substantially below about 50° C. or above about 80° C.

7. In a process for the production of a chlorosulphonate selected from the group consisting of sodium chlorosulphonate and ammonium chlorosulphonate, the step comprising reacting a chloride selected from the group consisting of sodium chloride and ammonium chloride, suspended in a gaseous medium, with gaseous sulphur trioxide, the temperature of the reaction mixture being maintained between about 50° and 100° C.

8. In a process for the production of sodium chlorosulphonate, the steps comprising reacting sodium chloride suspended in a gaseous medium with gaseous sulphur trioxide, the temperature of the reaction mixture being maintained between about 50° and 80° C.

9. In a process for the production of ammonium chlorosulphonate, the step comprising reacting ammonium chloride suspended in a gaseous medium with gaseous sulphur trioxide, the temperature of the reaction mixture being maintained between about 50° and 80° C.

ERNEST J. TAUCH.
RALPH K. ILER.